J. L. JOHNSON.
MOLDING MACHINE.
APPLICATION FILED JULY 14, 1916.

1,221,452.

Patented Apr. 3, 1917.
8 SHEETS—SHEET 1.

WITNESSES:
C. B. Knudsen,
A. G. Peterson.

INVENTOR:
J. L. JOHNSON,
BY Michael J. Stark & Sons,
ATTORNEYS.

J. L. JOHNSON.
MOLDING MACHINE.
APPLICATION FILED JULY 14, 1916.

1,221,452.

Patented Apr. 3, 1917.
8 SHEETS—SHEET 2.

WITNESSES:
C. B. Knudsen,
A. G. Peterson.

INVENTOR:
J. L. JOHNSON,
BY Michael J. Stark & Sons
ATTORNEYS.

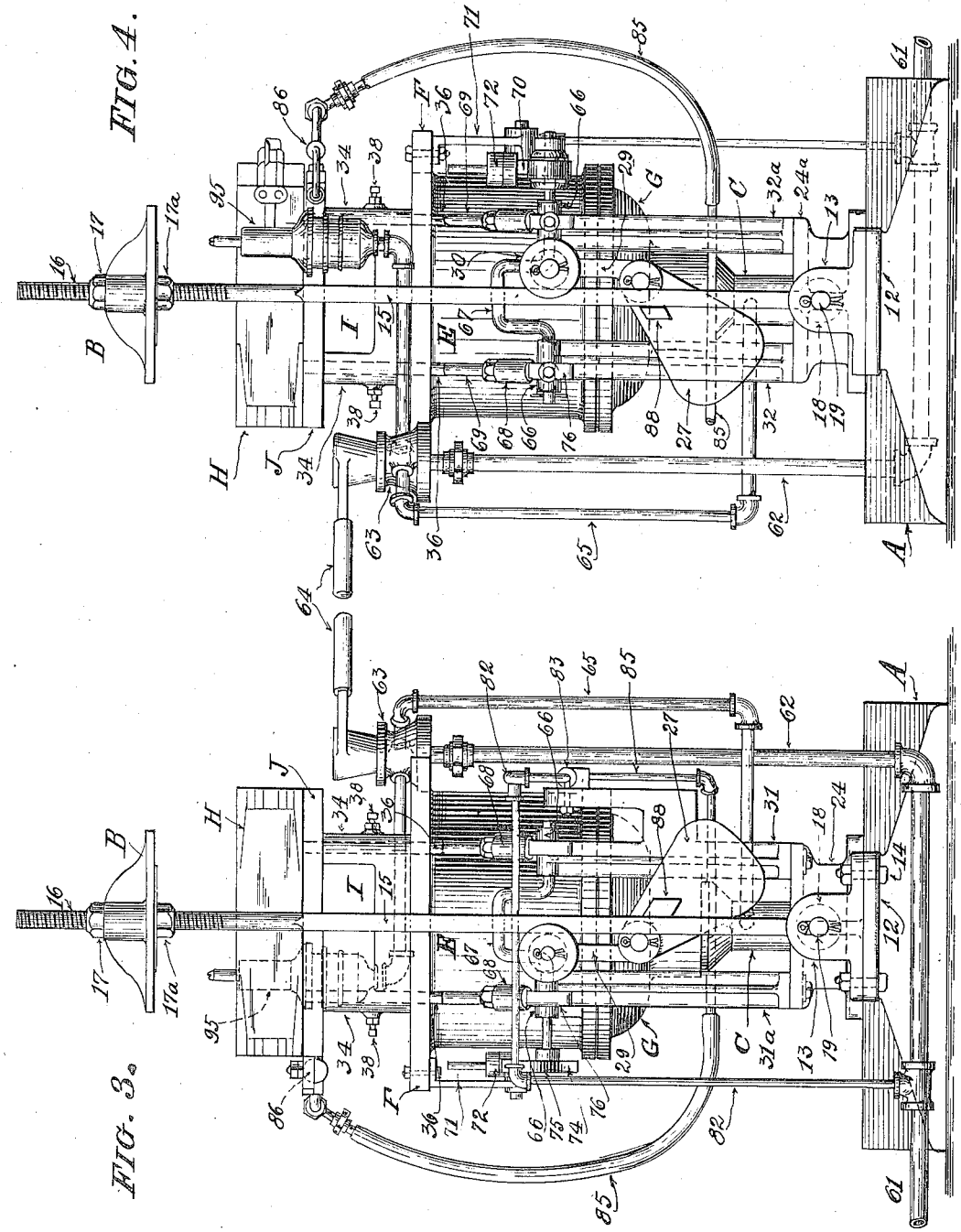

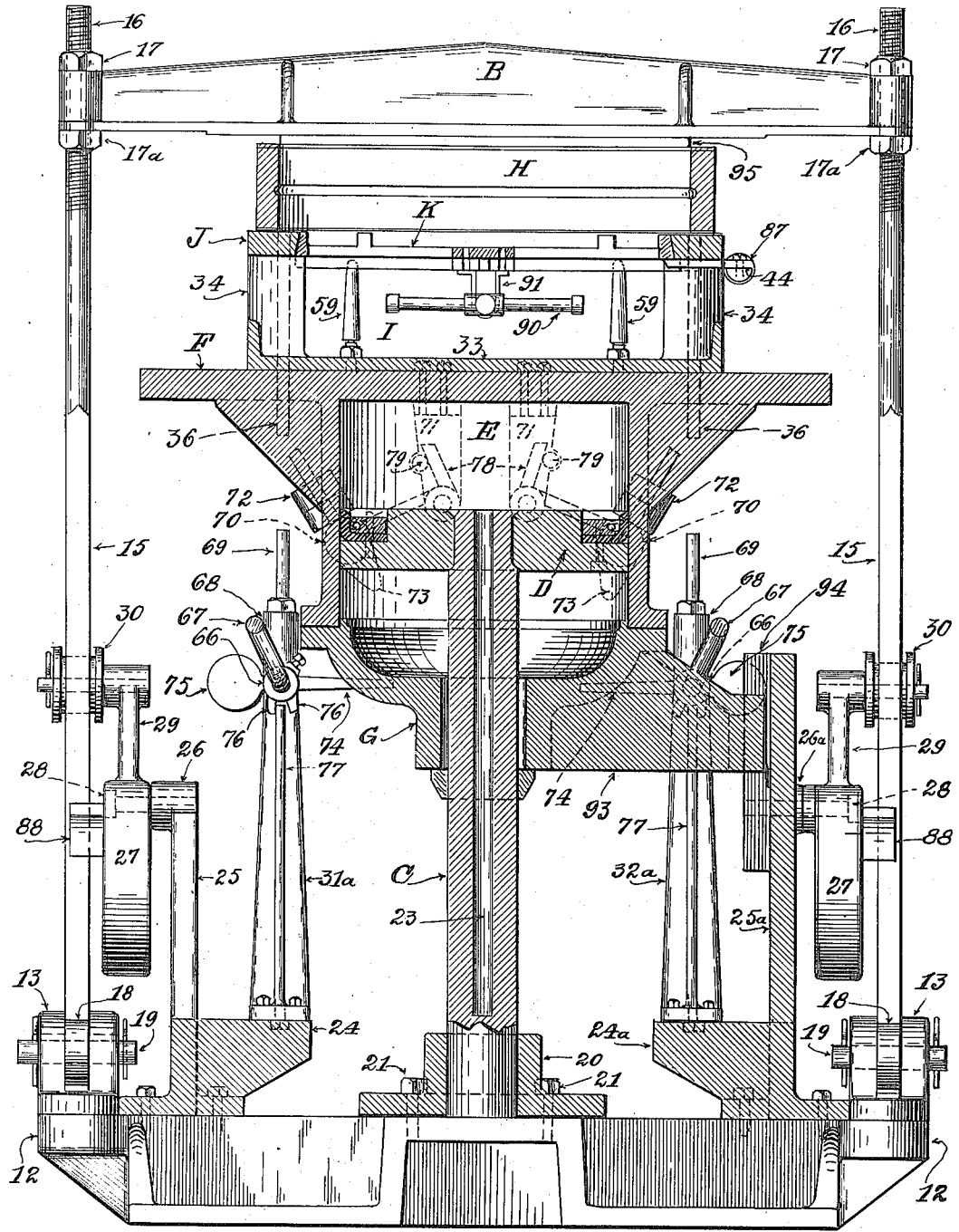

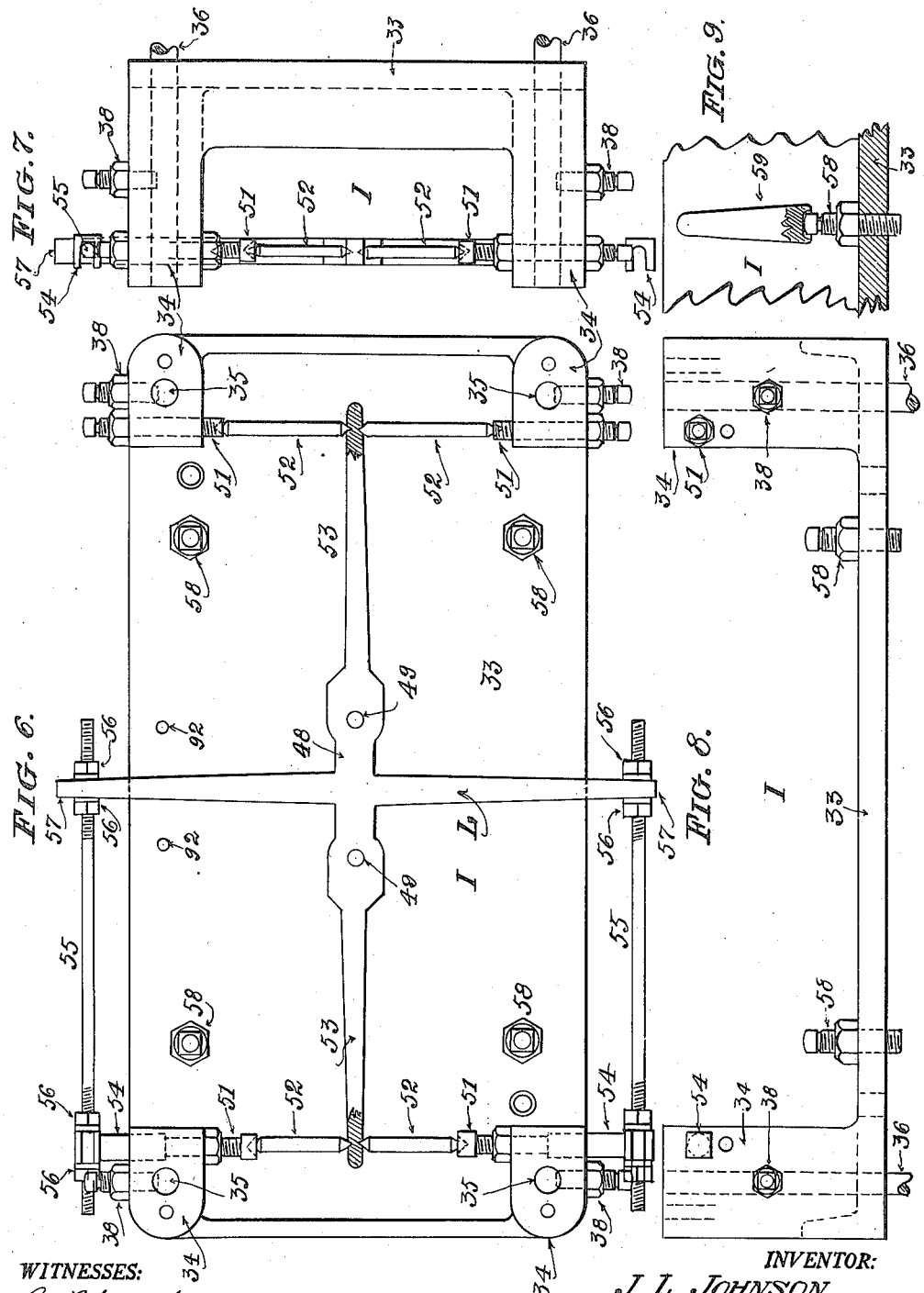

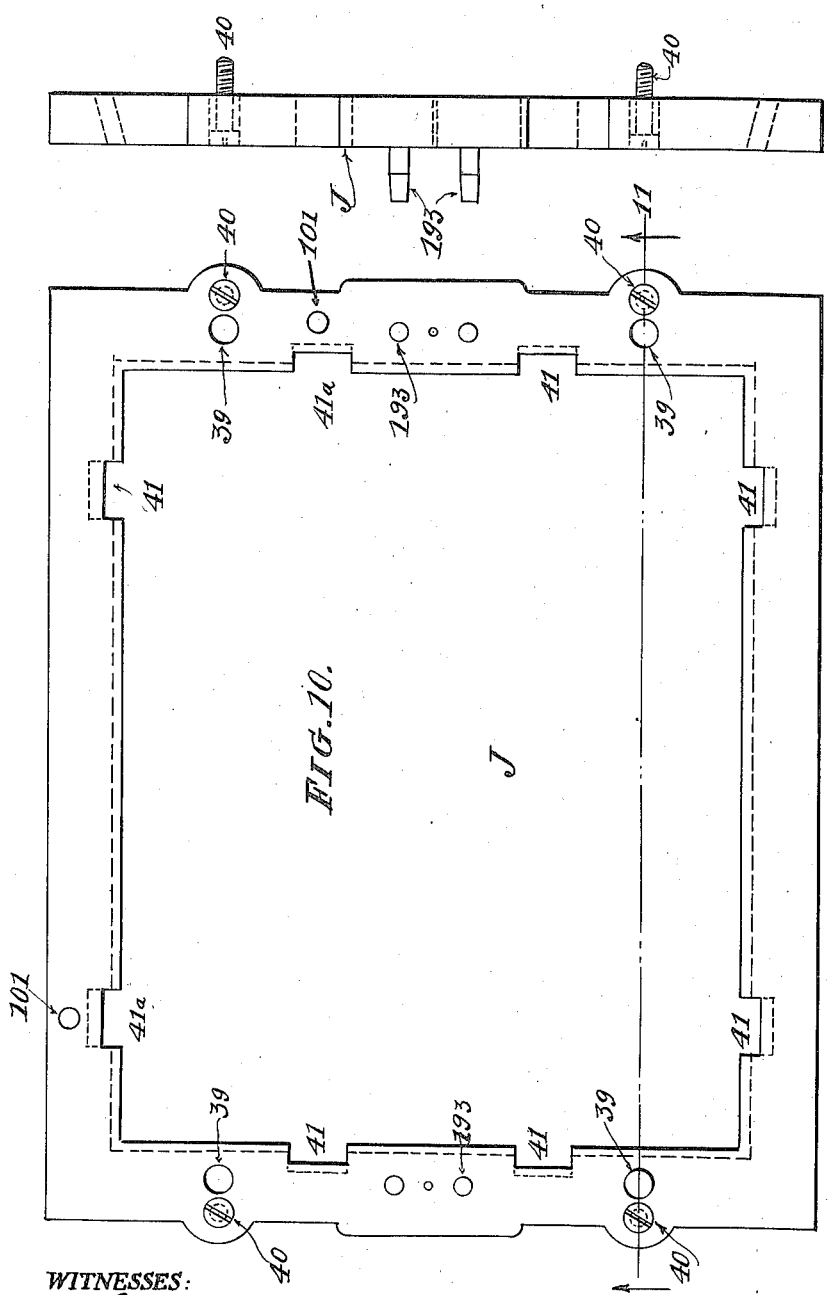

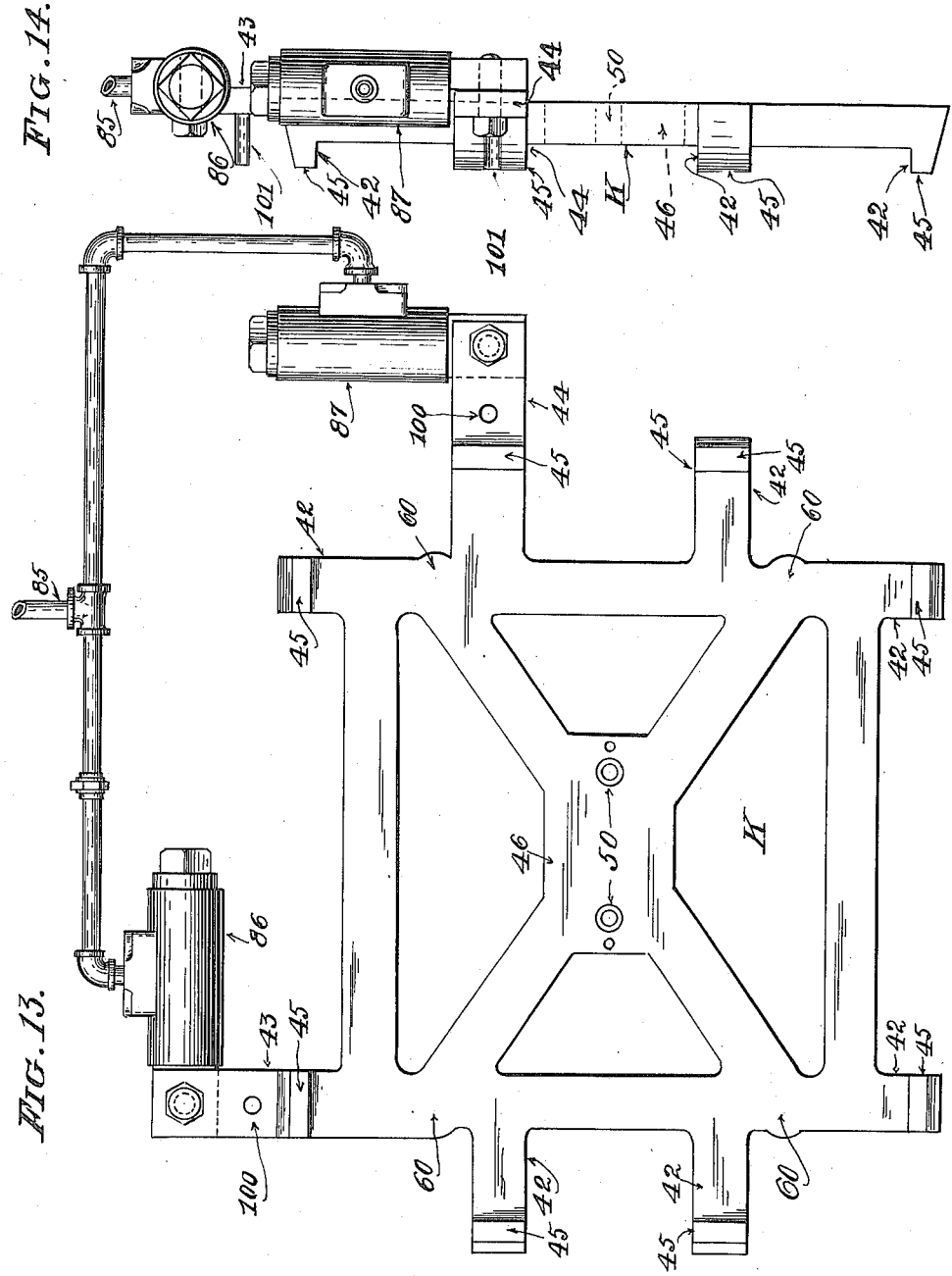

J. L. JOHNSON.
MOLDING MACHINE.
APPLICATION FILED JULY 14, 1916.

1,221,452.

Patented Apr. 3, 1917.
8 SHEETS—SHEET 8.

WITNESSES:

INVENTOR:
J. L. JOHNSON,
BY
ATTORNEYS.

UNITED STATES PATENT OFFICE.

JOHN LOUIS JOHNSON, OF CHICAGO, ILLINOIS, ASSIGNOR TO ILLINOIS MALLEABLE IRON CO., OF CHICAGO, ILLINOIS, A CORPORATION OF ILLINOIS.

MOLDING-MACHINE.

1,221,452.      Specification of Letters Patent.      Patented Apr. 3, 1917.

Application filed July 14, 1916. Serial No. 109,316.

*To all whom it may concern:*

Be it known that I, JOHN LOUIS JOHNSON, a citizen of the United States, and a resident of the city of Chicago, in the county of Cook and State of Illinois, have invented a certain new and useful Improvement in Molding-Machines; and I do hereby declare that the following description of my said invention, taken in connection with the accompanying sheets of drawing, forms a full, clear, and exact specification, which will enable others skilled in the art to which it appertains to make and use the same.

My invention relates generally to improvements in molding machines; and it consists, essentially, in the novel and peculiar combination of parts and details of construction, as hereinafter first fully set forth and described and then pointed out in the claims.

The object of this invention is the production of a molding machine in which the flask is moved vertically against a press-head to compress the sand in the mold, and the pattern is vibrated while the mold remains stationary and the pattern plate with its attached pattern is downwardly moved to draw the pattern from the mold.

Figure 1:
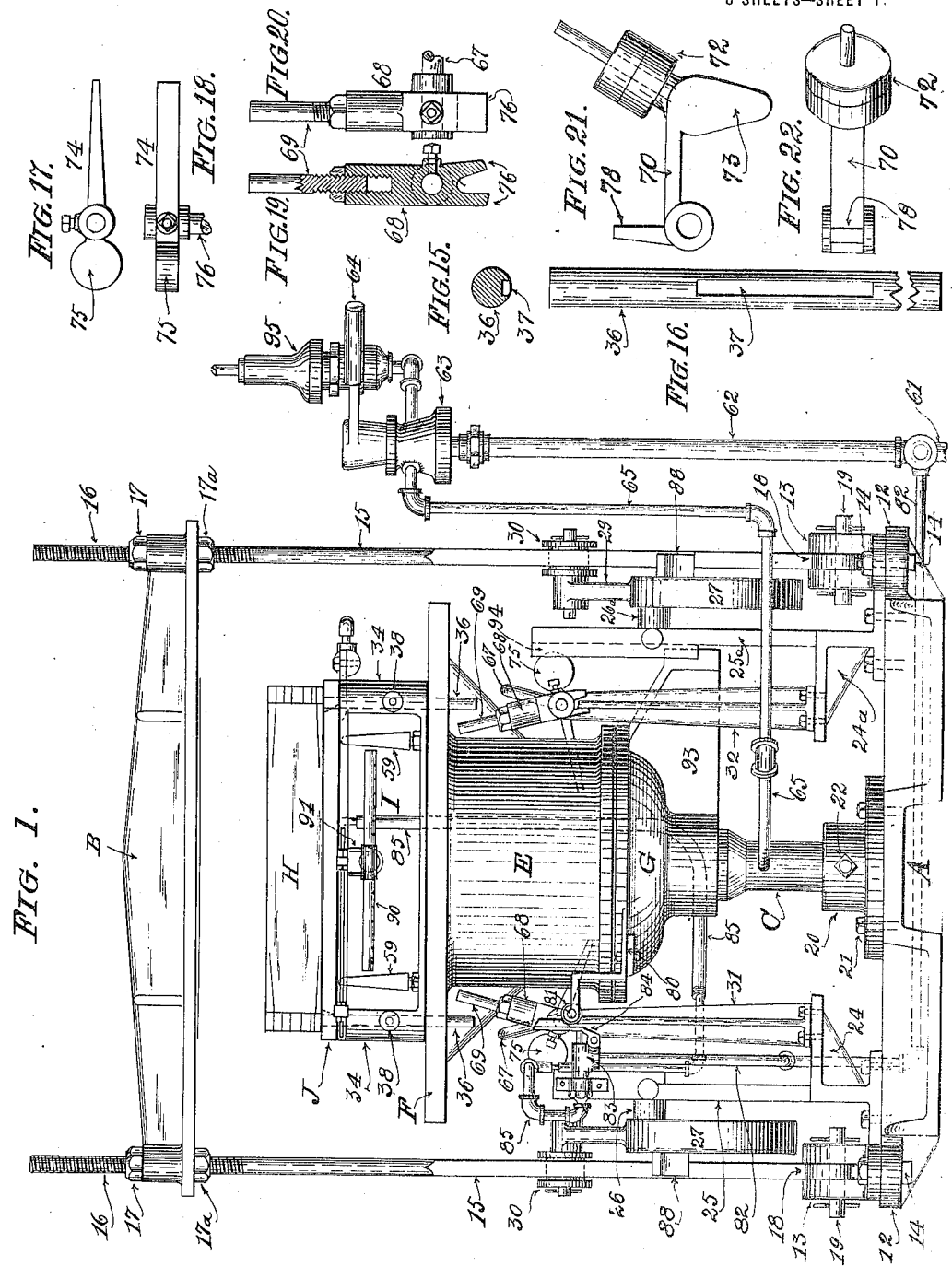
Figure 2:
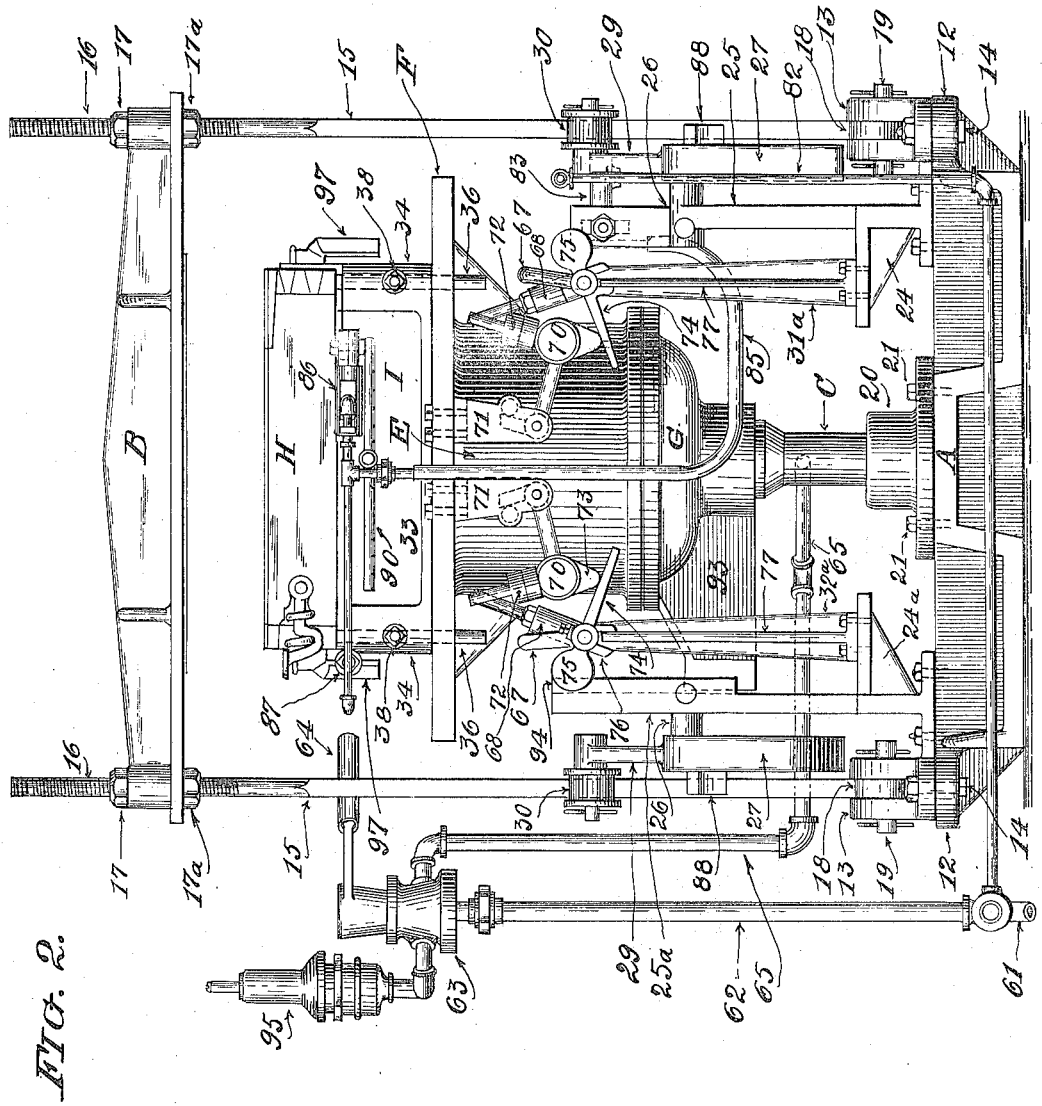
Figure 23:
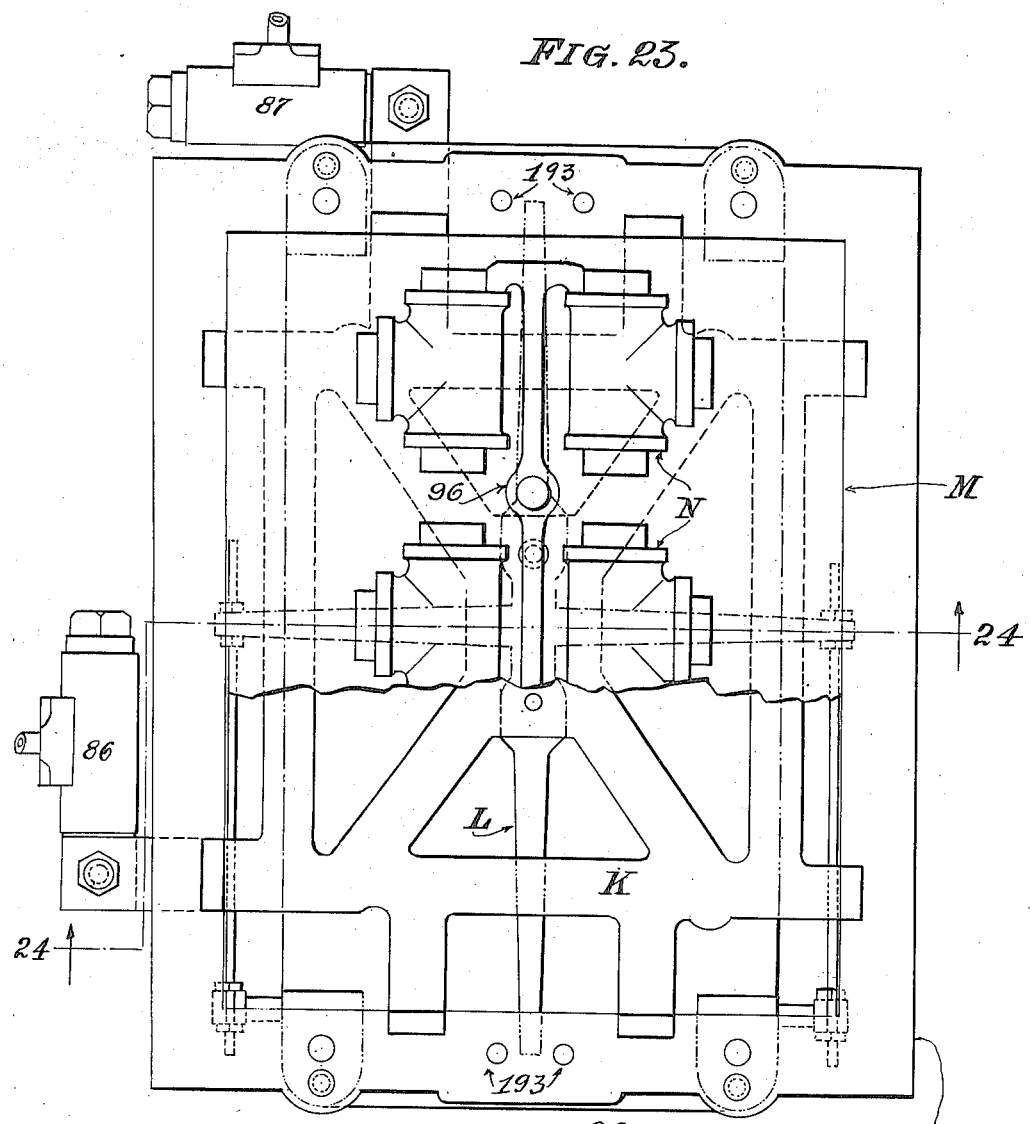
Figure 24:
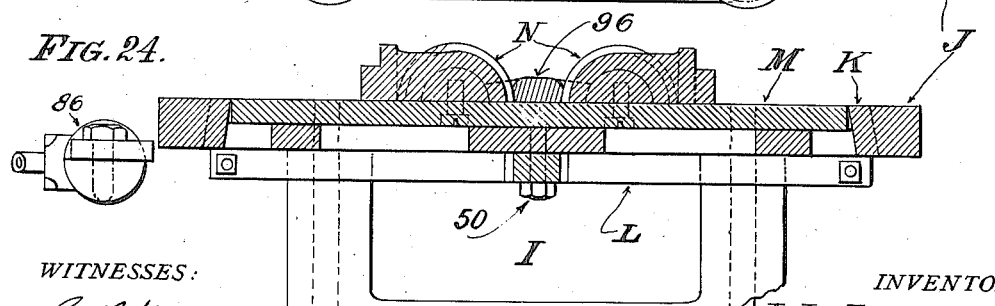

In the drawings which form a part of this specification, and illustrate the preferred embodiment of my invention, Figure 1 is a front elevation of my improved molding machine. Fig. 2 is a rear elevation of the same. Fig. 3 is an end elevation illustrating the left end thereof, and Fig. 4 is a like view showing the right end thereof. Fig. 5 is a longitudinal sectional elevation of the machine, minor parts, fully illustrated in other figures, being omitted. Fig. 6 is a plan view of the frame upon which the pattern plate is mounted. Fig. 7 is an end elevation, and Fig. 8 is a side elevation of the same. Fig. 9 is a fragmental detail, showing the support for the frame or chase. Fig. 10 is a plan view of the frame detached. Fig. 11 is a sectional view on the line 11—11 of Fig. 10. Fig. 12 is an end view of the same. Fig. 13 is a plan of the spider to which the pattern plate with its patterns is removably affixed. Fig. 14 is an end elevation of the same. Fig. 15 is a section of one of the flask supporting pins; and Fig. 16 is an elevation of the same. Fig. 17 is a detail view of one of the levers on the crank shafts, and Fig. 18 is a plan of the same. Fig. 19 is a sectional detail view of one of the arms on said crank shafts, and Fig. 20 is an elevation thereof. Fig. 21 is an elevation of one of the bell crank levers, and Fig. 22 is a plan thereof. Fig. 23 is an assembly plan of the mechanism above the platen of the machine, the pattern plate with its attached half pattern, and the chase being shown in solid lines, the spider in the chase being shown in dotted lines, the cross underlying the chase being indicated in dashes and dots, and the cross beneath this spider being shown in dashes separated by two dots, as far as possible, while the box on which the above parts are mounted is indicated partly in solid lines where not obscured by superimposed parts, the remainder of the box being depicted by long dashes and a dot between the dashes, about one-half of the pattern plate being broken away to disclose portions of the underlying parts. Fig. 24 is a transverse section on the indirect line 24—24 of Fig. 23, the pattern shown representing a so-called T.

Like parts are designated by the same characters and symbols of reference in all the figures.

A, in the drawings designates the base or bed-plate of this molding machine. It is a very substantial, approximately square, casting, having at opposite ends laterally projecting flanges 12, to which double eyes 13 are securely bolted by bolts 14. In these double eyes 13 there are pivotally arranged vertically extending rods 15 square in cross section for some distance from their lower extremities, and round for the upper portion thereof, a part of the round portion being screw threaded as indicated at 16, and provided with lock-nuts 17, 17ª, between which the press head B is securely and adjustably retained. The lower ends of the side rods 15 are formed into eyes 18 to receive pivot bolts or rods 19, around which the side rods 15 may rotate, as will hereinafter more fully appear.

Centrally located upon the base plate A there is a step 20 bolted to the base plate by bolts 21 in which step there is removably affixed by a set screw 22, Fig. 1, an upstanding rod C, which rod is tubular in form, it having a bore 23 and which carries at its upper extremity a piston D, Fig. 5. Over this piston there is placed a cylinder E which cylinder is formed, preferably, integral, with a platen F, the open lower end of said cylinder being closed by a cylinder head G. Near each end of the base plate A there is located a supporting member 24, 24ª respectively, each of which has, preferably formed integrally therewith, a standard 25, 25ª, the upper ends 26, 26ª are provided with punctured bosses to which are pivoted counterweights 27 by pivot bolts 28, Fig. 5. These counterweights have each an upwardly extending arm 29 to which are rotatively secured flanged rollers 30 which rollers bear upon the side bars or rods 15, as clearly illustrated in the drawings.

At each end of the supporting members 24, 24ª there are located a pair of upwardly extending standards 31, 31ª, and 32, 32ª, respectively, four in all, to which I shall hereinafter again refer.

Upon the platen F there is removably secured the mechanism and elements comprising the pattern retainer and the molding flask, and the means for vibrating the pattern plate; which instrumentalities include a frame structure I, shown in detail in Figs. 6, 7, 8 and 9, and which structure I shall frequently refer to as a box. This frame structure consists of a plate 33, rectangular in conformation, which plate has at each of its four corners a post 34. These posts and the plate 33 are punctured at 35 to receive slidable rods 36, which rods, shown in detail in Figs. 15 and 16, Sheet 1, are provided with grooves 37 into which the points of set screws 38, Figs. 6 and 7, enter. The length of these grooves 37 is such that when the rods 36 are in normal position the upper ends of said rods will be bearing against the molding flask H.

Upon the frame structure I there is removably retained a chase J, said chase being a rectangular open frame having four holes 39 at a position corresponding to the position of the four holes 35 in the posts 34 so that the pins 36 may enter these holes 39 and be flush with the upper face of the chase, said chase being secured to the posts by preferably countersunk bolts 40. In the inner margins of the chase J there are a series of notches 41, to receive what I term a "spider" K, shown in detail in Figs. 13 and 14. This spider K is likewise a substantially rectangular frame having sidewise and endwise extending projections 42 and two longer projections 43, 44 respectively; the projections 42 being constructed to enter the notches 41 in the chase J, and the projections 43, 44 to engage in the notches 41ª. All of these projections have upwardly extending noses 45, the upper faces of which are, when the chase is located in the frame structure or box I, flush with the upper face of said frame structure.

Centrally in the spider K there is a plate 46, in which there are two holes 47 to which the pattern plate M with its patterns N is removably bolted.

The inner margins of the chase J are beveled or undercut, best shown in Fig. 24, while the outer margins of the pattern plate are square, which undercutting is arranged so that any molding sand that may get between the pattern plate and the chase will not lodge in the joints but drop downwardly into the frame structure or box I. And in this connection I will remark that the pattern plate fits between the inner margins of the noses 45 on the spider a reasonably close fit.

On the spider K, at any suitable place, I locate preferably a sufficient number of guide pins 100 and at corresponding positions in the chase I locate holes 101, which holes are 2/1000 of an inch (more or less) larger in diameter than the external diameter of said pins 100, and which afford the desired longitudinal and transverse play of the pattern plate located on said spider in a very cheap but nevertheless very efficient manner. Instead of locating these pins in connection with their receiving holes, as described, I may fit the lateral projections 42 on the spider K into the notches 41, 41ª in the chase with a play of 2/1000 of an inch and thereby accomplish the desired result without the employment of said guide pins 100.

Referring now to Figs. 6 and 7, it will be noted that in the box structure I there is located a cross L. This cross has centrally an enlargement 48, in which there are two holes 49, spaced to correspond to the two holes 47 in the central portion 46 of the spider K, by which, and bolts 50, the spider K is secured to the cross L. This cross is adjustably held in the box I in the following manner:

In the posts 34 of the box I there are four set-screws 51, the inner ends of which are countersunk and these countersinks are engaged by pointed rods 52, one end of which enters the countersink in one of said set screws, while the other ends of said pointed rods engage countersinks in the flanks of the longitudinal members 53 of said cross. In two opposing posts 34 there is in each post a slotted stud 54, and this slot receives a rod 55 which is screwthreaded at both ends and provided with lock nuts 56. These two rods 55 engage the terminals 57 of the transverse members of the cross L so that by making proper adjustments of the set screws 51 and the locknuts 56 on the rods 55, the spider, and with it the pattern plate can be very delicately adjusted without interfering with the vibration of the pattern plate.

In order to provide for vertical adjustment of the spider there are located in the box I four adjusting screws 58, Figs. 6, 8, and 9, upon which are located posts 59, which bear at their upper ends against the under side of the spider at the points marked 60 in Fig. 13. By manipulating these set screws 58 the pattern plate can be raised and lowered so that its upper surface is flush with the upper surface of the chase to compensate for any variation in the thickness of different pattern plates that may be used in this machine and also to facilitate assembling of the parts.

As heretofore stated, the flask H, which is preferably a so-called snap flask, is placed upon the chase J and the former filled with the sand which is then compressed by placing a board 95, Fig. 5, and elevating the platen with its cylinder, and this is accomplished in the following manner:

An air pipe 61 supplying compressed air under a pressure of from 60 to 80 lbs. per square inch is led to the machine and provided with a stand pipe 62. This stand pipe connects to a stop valve 63 of any approved design and having an operating handle 64 by which the admission and discharge of air to the cylinder E can be controlled. From this stop valve leads piping 65 to the bore 23 of the piston rod C so that when the stop valve 63 is opened air will pass to the interior of the cylinder E and thus force the said cylinder and all parts and accessories above the platen upwardly toward the head or cross rail B. When this stop valve 63 is set to discharge the air from the cylinder the latter will descend slowly, but the flask H will remain in its elevated position, and this is accomplished by the following mechanism:

I have already referred to the two pairs of standards 31, 31ª, 32 and 32ª; these standards are of cross shaped transverse section, and they carry at their upper terminals bearings 66, wherein are journaled cranked axles or shafts 67. Upon these shafts are mounted arms 68, each of which is provided with an upstanding pin 69, adjustably secured in said arms the position of which, when in vertical position as shown in Fig. 5, coincides with that of the four pins 36 projecting from the lower surface of the platen F.

Depending from the platen F there are two brackets 71, to the lower end of each of which there is pivoted a bell crank lever 70, which has, projecting at its free end a bar on which there is placed a counterweight 72 while opposed to this counterweight there is a nose 73, as clearly illustrated in Fig. 2.

At the corresponding end of each of the crank shafts 67 there is fixed a lever 74 provided with a counterweight 75 and with two downwardly projecting lugs 76 spaced apart to engage the rib 77 of the standard 31ª and 32ª, respectively. These lugs 76 perform the function of stops to the arms 68, so that when the arms are at an inclined position, as shown in Fig. 2, one of these lugs bears against one side of said rib, while when the arms are in vertical position, shown in Fig. 5, the opposing lugs 76 bear against the opposing sides of said ribs 77.

On the bell crank levers 70 there are arms 78; and on the depending brackets 71 there are stop pins 79, whereby the movement of the bell crank levers 70 is limited in one direction.

I shall now describe the operation of the mechanism just described, which retains the molding flask H in elevated position to enable the patterns to be drawn:

In their normal position, as shown in Fig. 2, when the platen with its superposed flask is down, the noses 73 of the bell crank levers 70, bearing upon the arms 74, keep the arms 68, having the pins 69, in the inclined position shown in said Fig. 2.

When air is admitted to the cylinder E to cause the platen F to ascend, the counterweights 75 on the arms 74 cause these arms to follow the noses until arrested by the proper stop 76, which will have brought the pins 69 to vertical position, the platen having in the meantime risen to its limit of elevation. These pins 69 are now in alinement with the pins 36 in the box I so that when air is permitted to escape from the cylinder E and the platen F begins its descent, these pins 69 and 36 will contact and thereby keep the flask H in elevated position ready for the removal of said flask, which is facilitated by swinging the head B backward. The descent of the platen is rather slow to afford the operator time to swing the head backward and remove the molding flask, so that when at the later stage of the descent of the platen, the noses 73 reach the arms 74, the latter will be depressed and the pins 79 returned to their normal inclined position, after which the pins 36 in the box I will drop by gravity to their lower position.

When the platen F at the first stage of its descent reaches the point where the pins 69 and 36 contact, the pattern plate is rapped or vibrated in longitudinal and transverse directions to permit the patterns to be withdrawn from the sand in the mold without injuring the mold, and without the employment of stripping plates. This function is accomplished by the following mechanism:

To the cylinder E, Fig. 1, there is attached an angle bracket 80, carrying at its free end a roller 81. Leading from the main air supply pipe 61 there is a branch pipe 82, which terminates in an air valve 83, to which is pivoted an arm 84, which arm, in normal position, is in the path of the descending roller 81, so that as soon as this roller reaches the arm 84, which is just previous to the movement when the flask is held up in its descent, this roller will force the arm backward to open the valve 83, and to permit air to pass therethrough. From this valve 83 leads piping 85, Figs. 1, 2, 3, 4 and 13, and others, especially the latter figure, to vibrators 86, 87, the former of which is attached to the longer projection 43, and the latter of which is attached to the corresponding projection 44 on the spider K, whereby the pattern plate with its attached patterns is vibrated very rapidly, the movement produced thereby of the patterns being, however, infinitesimal and does not exceed one thousandth of an inch in both longitudinal and transverse directions as already stated. The air admitted to the valve 83 is cut off, however, as soon as the roller 81 has passed the arm 84 in its descent, so that air is used only during the short space of time that the patterns are drawn from the mold. When the cylinder E ascends, which it does rather rapidly, the valve 73 is again opened for a short time which causes the vibrators 86, 87 to rap the pattern plate and thereby cause the sand in the mold H to pack snugly around these patterns.

It will now be noted that the pattern plate with its attached patterns is very sensitively supported in the machine so that it can readily and effectively answer to the vibrations produced by the vibrators.

It is obvious that this machine is adapted to receive different pattern plates M having the same longitudinal and transverse dimensions, but different patterns N, without changes in the machine; but pattern plates of different dimensions can be accommodated in the machine by substituting proper spiders and crosses, and also different boxes I when necessary, for those shown, especially so in an establishment where many molders are employed, each of whom is furnished with, and working on, a different molding machine.

The advantages derived from the use of molding machines of the nature described are manifold: A laborer or mere tyro can be broken in to operate such a machine in a few days and then produce perfect castings, which owing to the fact that the patterns are automatically rapped, are true to pattern, and perfectly uniform, and that there is no ramming whatever by hand of the sand in the flask, thereby avoiding uneven packing of the sand in the flask, which in hand ramming is liable to produce uneven packing, and frequently results in defective castings.

The head B with its side bars is counterbalanced by the weights 27 which weights have projecting lugs 88, which engage the side bars 15 when the latter are in perpendicular position and central of the machine.

In a molding machine of the nature described it is desirable that the pattern plate with its attached half patterns be slightly heated, especially during the colder season, in order to prevent the sand from adhering to these parts, and for other obvious reasons. To accomplish this result I locate a gas heater 90 below the pattern plate in the box I, which burner is supported in a yoke 91 in any desired and effective manner, fuel being supplied to the burner by a flexible tube, not shown, to permit the burner to participate in the vertical movements of the platen.

In order to prevent slight rotation of the cylinder E and the attached parts, I provide the head G of the cylinder with a radially extending armor slide 93, and also provide the standard 25$^a$ with guides wherebetween the slide 93 operates. This feature of a molding machine is desirable because, were the cylinder permitted to rotate slightly, the pins 36 and 69 would be liable to be thrown out of alinement and thereby rendered inoperative.

As already referred to, the descent of the platen with its attached and superposed elements is rather a slow one, and this slow movement is accomplished by connecting a check valve 95 with the stop valve 63, which check valve is preferably spring-loaded, and the degree of compression of the spring made adjustable so as to regulate the discharge of the spent air to a nicety. Any of a number of such regulation valves which are commercial articles can be used more or less efficiently in this machine, as also the vibrators 86 and 87. In this connection I will state that the patterns N shown in Figs. 23 and 24 are half patterns only; and these halves are so carefully and accurately located on both sides of the longitudinal center line that when a cope and a drag are both molded on the same pattern plate, and then placed on each other ready for pouring, the cavities in the mold are in exact opposition and match perfectly.

In Fig. 23 I have omitted to show the rods 52 and other details connected with the cross I, such details being clearly illustrated in Figs. 6 and 7. And in this Fig. 23 I have shown the sprue 96 connected to one pair of patterns N, the connection between said sprue and the remaining patterns being omitted, owing to the breaking off of the pattern plate and the remaining patterns; but since this detail forms no part of my invention I consider a showing thereof unimportant and not necessary to a full understanding of my invention.

And finally I will state that the molding flask is not guided upon the machine by the usual dowel pins 97, shown in Fig. 2, but upon dowel pins 193, Figs. 10 and 11, which pins enter holes in the edges of the flasks, and which holes are perfect matches in both the cope and the drag of the snap flask, and correspond also to the usual dowel pins of said flask by which finally the two parts of the mold are assembled before removing the snap flask from the molding machine.

I have heretofore described with considerable minuteness the preferred embodiment of my invention, but I desire it to be understood that many of the details of construction disclosed may be varied, and parts thereof omitted without departing from the scope of my invention as set forth in the subjoined claims.

Having thus fully described this invention I claim as new, and desire to secure to myself by Letters Patent of the United States:—

1. In a machine of the nature described, the combination, of a base, a stationary piston mounted on said base, a cylinder constructed to movably engage said piston, a platen connected with said cylinder, a pattern plate mounted on said platen, a molding flask removably supported on said pattern plate, means for imparting to said pattern plate vibratory movement, and means for elevating said pattern plate at predetermined speed and means for lowering said pattern plate at a slower speed.

2. In a machine of the nature described, the combination, of a base, a stationary piston mounted on said base, a cylinder constructed to movably engage said piston, a platen connected to said cylinder, a pattern plate mounted on said platen, a molding flask removably supported on said pattern plate, means constructed to elevate said cylinder at predetermined speed, means constructed to lower said cylinder at a slower speed, means constructed to impart vibratory movement to said pattern plate at the commencement of its descent, and means for supporting said flask in its elevated position while the pattern plate is descending.

3. In a machine of the nature described, the combination of a base, a stationary piston mounted on said base, a cylinder constructed to movably engage said piston, a platen connected to said cylinder, a pattern plate mounted on said platen, a molding flask removably supported on said pattern plate, means constructed to elevate said cylinder at predetermined speed, means constructed to lower said cylinder at a slower speed, means constructed to impart vibratory movement to said pattern plate at the commencement of its descent, and means for supporting said flask in its elevated position while the pattern plate is descending, the means for vibrating the pattern plate being entirely automatically operated.

4. In a machine of the nature described, the combination, of a base, a stationary piston mounted on said base, a cylinder constructed to movably engage said piston, a platen connected to said cylinder, a pattern plate mounted on said platen, a molding flask removably supported on said pattern plate, means constructed to elevate said cylinder at predetermined speed, means constructed to lower said cylinder at a slower speed, means constructed to impart vibratory movement to said pattern plate in two stages, once at the commencement of the ascent of said cylinder, and again at the commencement of the descent thereof, and means for supporting said flask in its elevated position while the pattern plate is descending.

5. In a machine of the nature described, the combination, of a base, a stationary piston mounted on said base, a cylinder constructed to movably engage said piston, a platen connected to said cylinder, a pattern plate mounted on said platen, a molding flask removably supported on said pattern plate, means constructed to elevate said cylinder at predetermined speed, means constructed to lower said cylinder at a slower speed, means constructed to impart vibratory movement to said pattern plate in two stages, once at the commencement of the ascent of said cylinder and again at the commencement of the descent thereof, and means for supporting said flask in its elevated position while the pattern plate is descending, said means for vibrating the pattern plate being entirely automatically operated.

6. In a machine of the nature described, the combination, of a pattern plate, a series of patterns mounted on said plate, and means for automatically imparting vibratory movement to said pattern plate, said means including a vibrator connected with said pattern plate, a movable element on which said pattern plate is mounted, an air admission valve, piping connecting said valve to said vibrator, and means connected to said movable element constructed to open and close said admission valve.

7. In a machine of the nature described, the combination, of a pattern plate, a series of patterns mounted on said plate, and means for automatically imparting vibratory movement to said pattern plate, said means including a vibrator connected to said pattern plate in longitudinal direction, a further vibrator connected to said pattern plate in transverse direction, a movable element on which said pattern plate is mounted, an air admission valve, piping connecting said air admission valve to said vibrators, and means connected to said movable element constructed to open and close said admission valve.

8. In a machine of the nature described, means for supporting a molding flask in elevated position while the pattern plate is downwardly moving from said flask, said means including a reciprocating element, a pair of shafts in parallel spaced relation, a multiplicity of levers mounted on said shafts, said levers being normally in inclined position, a platen, a pattern plate supported on said platen, pins constructed to engage said levers and to bear against said pattern plate, a molding flask on said pattern plate and means constructed to turn said levers to vertical position when said vertically reciprocating element is in its upwardly moving condition, and to intercept said pins when said reciprocating element is on its downward course.

9. In a machine of the nature described, the combination, of a vertically reciprocating element, a platen on said latter element, a pattern plate on said platen, a pair of shafts in parallel spaced relation, a multiplicity of levers mounted on said shafts, said levers being normally held in inclined position, pins extending downwardly from said platen and constructed to bear against said pattern plate, and to engage said levers when the latter are in vertical position, and means connected to said vertically reciprocating element, constructed to release said levers to assume a vertical position, when said vertically reciprocating element is in its ascent, and to arrest the downward movement of said pins when said reciprocating element is on its descent.

10. In a machine of the nature described, the combination, of a vertically reciprocating elevator, a platen on said elevator, a pattern plate on said platen, a pair of shafts in parallel spaced relation, a multiplicity of levers mounted on said shafts, counterweights on said levers, said levers being normally in inclined position, pins extending downwardly from said platen, said pins bearing at their upper ends upon said pattern plate, means connected to said platen constructed to hold said levers in normal inclined position but to release the same when said elevator is ascending to permit said levers to assume a vertical position, and to force said levers back to their normal position when said elevator is descending.

11. In a machine of the nature described, the combination of a vertically reciprocating elevator, a pattern plate supported on said elevator, a molding flask removably supported by said pattern plate, a pair of shafts in spaced relation, a multiplicity of levers mounted on said shafts, said levers being normally in inclined position, counterweights on said levers, pins extending downwardly below said pattern plate, elastic means connected to said elevator constructed to hold said levers in normal position but to release the same when said elevator is ascending to permit said levers to assume a vertical position, and to force said levers back to their normal position when said elevator is descending.

12. In a machine of the nature described, the combination, of a vertically reciprocating, fluid actuated elevator, a pattern plate supported by said elevator, a molding flask carried on said pattern plate, shafts in parallel spaced relation disconnected from said elevator, a multiplicity of bell crank levers mounted on said shafts, counterweights on said bell crank levers, the arms of said bell crank levers being normally in inclined position, pins extending downwardly below said pattern plate, further levers pivotally connected to said elevator, said latter levers being weighted and constructed to hold said bell crank levers in their normal position but to release the same when said elevator is ascending to permit one arm of said bell crank levers to assume a vertical position to arrest the downward movement of said pins, and to force said bell crank levers back to their normal position when said elevator is descending.

13. In a machine of the nature described, the combination, of a fluid-actuated elevating device, a box-shaped member supported by said elevating device, a frame or chase supported by said box, a spider movably located in said chase, a pattern plate secured to said spider, a series of downwardly extending lifting pins in said box, and means actuated by said elevating device constructed to automatically engage said pins when said elevating device is in its descent.

14. In a machine of the nature described, the combination, of a stationary piston, a tubular piston rod to which said piston is affixed, said piston being supported in elevated position, a cylinder movably engaging said piston, fluid means for moving said cylinder in vertical upward direction at a predetermined speed including an inlet valve constructed to admit air to said cylinder, and means constructed to return said cylinder to normal position at a decidedly slower speed, said means including a spring-pressed check valve.

15. In a machine of the nature described, the combination of a stationary piston, said piston being supported in elevated position, a cylinder movably engaging said piston, fluid means for moving said cylinder in vertical reciprocating directions, standards at opposing sides of said cylinder, shafts in said standards, bell cranks mounted on said shafts, counter-weights on said bell cranks, said bell cranks having arms normally in inclined position, brackets depending from said cylinder, weighted arms pivoted to said brackets, said arms being constructed to hold said bell cranks in normal inclined inoperative position, but to release said bell cranks to cause them to assume operative positions, a flask carried upon said cylinder, and means connected with said flask constructed to support said flask in elevated position when said cylinder is on its descending course.

16. In a machine of the nature described, the combination, with an elevating device, of means for flexibly supporting a pattern plate on said elevating device, said means including a box shaped member having posts at its corners, a chase secured to said box shaped member, a spider movably supported in said chase, a cross secured to said spider below the same, a pattern plate on said spider, means for laterally and transversely adjusting said spider in said chase, and means for vertically adjusting said spider in said chase.

17. In a machine of the nature described, the combination, with an elevating device, of a box shaped member supported by said elevating device, a chase or open frame secured to said box shaped member, a spider movably supported in said chase, a pattern plate secured to said spider, a cross below said spider, and means secured to said box shaped member and to said cross for longitudinally and transversely adjusting said cross and therewith said spider with said pattern plate.

18. In a machine of the nature described, the combination, of a box shaped member supporting a chase or open frame secured to said box shaped member, a spider movably supported in said chase, a pattern plate secured to said spider, a cross below said spider, means secured to said box shaped member and to said cross for longitudinally and transversely adjusting said cross, and means connected to said spider to vibrate said spider at predetermined intervals.

19. In a machine of the nature described, the combination of a fluid-actuated elevating device, a box shaped member supported by said elevating device, a pattern plate mounted on said box shaped member, and means for longitudinally and transversely adjusting said pattern plate, said latter means including a cross to which said pattern plate is removably attached, a series of adjusting screws in said box shaped member constructed to move said cross transversely, and rods connected to said box shaped member constructed to move said cross longitudinally.

20. In a molding machine, a pattern plate, means for vibrating said pattern plate, said pattern plate being movable in both longitudinal and transverse directions, and means for adjusting and flexibly supporting said pattern plate, said means including vertically adjustable posts and a slender, longitudinally and transversely adjustable cross to which said pattern plate is secured.

21. In a molding machine, a pattern plate, means for vibrating said pattern plate in both longitudinal and transverse direction, and means for limiting the movements of said pattern plate, said pattern plate being normally sustained in central position, said pattern plate being adjustably and flexibly supported, said adjustable and flexible supporting means including a slender, longitudinally, transversely, and vertically adjustable element to which the pattern plate is attached.

In testimony that I claim the foregoing as my invention, I have hereunto set my hand.

JOHN LOUIS JOHNSON.